(12) United States Patent
Kumar et al.

(10) Patent No.: US 8,872,909 B2
(45) Date of Patent: Oct. 28, 2014

(54) METHOD AND APPARATUS FOR PERSONAL IDENTIFICATION USING FINGER IMAGING

(75) Inventors: Ajay Kumar, Kowloon (HK); Yingbo Zhou, Kowloon (HK)

(73) Assignee: The Hong Kong Polytechnic University, Kowloon (HK)

( * ) Notice: Subject to any disclaimer, the term of this patent is extended or adjusted under 35 U.S.C. 154(b) by 337 days.

(21) Appl. No.: 13/151,172

(22) Filed: Jun. 1, 2011

(65) Prior Publication Data

US 2011/0304720 A1 Dec. 15, 2011

Related U.S. Application Data

(60) Provisional application No. 61/353,231, filed on Jun. 10, 2010.

(51) Int. Cl.
*G06K 9/00* (2006.01)
*H01L 31/09* (2006.01)

(52) U.S. Cl.
CPC .......... *G06K 9/00892* (2013.01); *G06K 9/0008* (2013.01); *G06K 2009/00932* (2013.01)
USPC ............................................ 348/77; 382/124

(58) Field of Classification Search
CPC .. A61B 1/041; A61B 1/00036; A61B 1/0005; A61B 19/52; H04N 7/18; G06K 9/00; G06K 9/00885; G06K 2009/00932; G06K 9/00006; G06K 9/004; G06F 7/04; G06F 21/32; G07C 9/00158; G07C 9/00087; H01L 31/0224; H01L 31/09
USPC ............ 348/77, E07.085; 382/128, 116, 124, 382/115; 250/214.1
See application file for complete search history.

(56) References Cited

U.S. PATENT DOCUMENTS

| | | | |
|---|---|---|---|
| 6,813,010 B2 | 11/2004 | Kono et al. | |
| 8,285,010 B2 * | 10/2012 | Rowe | 382/124 |
| 2005/0254695 A1 | 11/2005 | Nagasaka et al. | |
| 2006/0177107 A1* | 8/2006 | Ishii | 382/115 |
| 2008/0298642 A1* | 12/2008 | Meenen | 382/115 |
| 2010/0021024 A1 | 1/2010 | Nagasaka et al. | |
| 2010/0045788 A1* | 2/2010 | Zhang et al. | 348/77 |
| 2010/0061598 A1 | 3/2010 | Seo | |
| 2010/0080422 A1 | 4/2010 | Sato | |
| 2010/0098304 A1 | 4/2010 | Kiyomizu et al. | |
| 2010/0142771 A1* | 6/2010 | Miura et al. | 382/124 |
| 2010/0310137 A1* | 12/2010 | Chou et al. | 382/124 |

OTHER PUBLICATIONS

Wu et al., "Driver identification using finger-vein patterns with Radon transform and neural network", Expert Systems with Applications, 2009, vol. 36, pp. 5793-5799.

(Continued)

*Primary Examiner* — Dave Czekaj
*Assistant Examiner* — Dramos I Kalapodas
(74) *Attorney, Agent, or Firm* — KPPB LLP

(57) ABSTRACT

A system for extracting finger vein and finger texture images from a finger of a person at the same time, the device including an image capture device configured to capture at least one image of at least one finger in a contactless manner, a feature extraction module configured to extract unique finger vein features and finger texture features from the at least one captured image, and a processing module configured to normalize the at least one captured image and integrate the extracted finger vein features and finger texture features.

14 Claims, 14 Drawing Sheets

(56) References Cited

OTHER PUBLICATIONS

Miura et al., "Extraction of Finger-Vein Patterns Using Maximum Curvature Points in Image Profiles", IEICE Trans. Inf. & Syst., Aug. 2009, vol. E90-D, No. 8, pp. 1185-1194.

Miura et al., "Feature extraction of finger-vein patterns based on repeated line tracking and its application to personal identification", Machine Vision and Applications, 2004, vol. 15, pp. 194-203.

Kumar et al., "Human Identification Using KnuckleCodes", IEEE Third International Conference of Biometrics: Theory, Applications and Systems, 2009, BTAS '09, pp. 1-6.

Zhang et al., "Multiscale feature extraction of finger-vein patterns based on curvelets and local interconnection structure neural network", Proc. ICPR, Hong Kong, 2006, 4 pgs.

Lee et al., "Restoration method of skin scattering blurred vein image for finger vein recognition", Electronics Letters, Oct. 8, 2009, vol. 45, No. 21, 2 pgs.

* cited by examiner

METHOD AND APPARATUS FOR PERSONAL IDENTIFICATION USING FINGER IMAGING

RELATED APPLICATION

This application claims priority to U.S. Provisional Patent Application 61/353,231 filed Jun. 10, 2010, the disclosure of which is incorporated herein by reference in its entirety.

TECHNICAL FIELD

The invention concerns systems and methods for extracting finger vein and finger texture images from human fingers at the same time.

BACKGROUND OF THE INVENTION

Reliable personal authentication is important for security in a networked society. Many physiological characteristics of humans, such as biometrics, are typically time invariant, easy to acquire, and unique for every individual. Biometric features such as face, iris, fingerprint, hand geometry, palm print, and hand signature have been suggested for the security relating to access control. Most of the current research in biometrics has been focused on fingerprints and the face. The reliability of personal identification using the face is currently low as researchers continue to grapple with the problems of pose, lighting, orientation and gesture. Fingerprint identification is widely used in personal identification as it works well in most cases. However, it is difficult to acquire fingerprint features such as minutiae, for some class of persons such as manual laborers, and elderly people. Several biometrics technologies are such susceptible to spoof attacks in which fake fingerprints, static palm prints, static face and iris images can be successfully employed as biometric samples to impersonate in the process of identification. Consequently, other biometric characteristics are receiving increasing attention.

Finger vein images acquired from near infrared or thermal infrared based optical imaging offers promising alternatives. The hand based biometric modalities which can be acquired in non-contact manner are most attractive in the foreseen market because of hygienic benefits which generates higher user-acceptance.

Personal identification using finger vein patterns have invited a great deal of research interest and currently several commercial products are available for civilian applications.

Finger vein identification using Radon transform based statistical features and a probabilistic neural network classifier has been successful. However the database employed in this work is too small to generate reliable conclusion on the stability of such features in the noisy vein patterns. Curvelet based extraction of finger vein patterns and its classification using back-propagation neural networks have been used. The performance from this approach is shown to be very high but the key details of their implementation are unknown. The restoration of finger vein images using point spread functions has also been investigated. There has been significant improvement in the performance of vein identification using such restored finger images. However, the finger vein imaging setup is rather constrained and restricts the rotation or the movement of fingers during the imaging. Most of the prior art devices require close contact of frontal finger surface with the imaging surface of the devices. There remains problems relating to hygiene, performance and user acceptance of finger vein biometrics devices and systems.

SUMMARY OF THE INVENTION

In a first aspect, there is provided a system for extracting finger vein and finger texture images from a finger of a person at the same time, the system including an image capture device to capture at least one image of at least one finger in a contactless manner, an feature extraction module to extract unique finger vein features and finger texture features from the at least one captured image, and a processing module to normalize the at least one captured image and integrate the extracted finger vein features and finger texture features.

The feature extraction module may extract a region of interest before extracting the unique finger vein features and finger texture features.

The system may further include a searching module to search a registration database using the extracted finger vein features to determine the identity of the person.

The feature extraction module may generate a robust matching score using the finger texture features to search against matching scores of templates stored in the registration database.

Normalization of the image may include rotational alignment, segmentation, or enhancement.

The unique finger vein features may be any one from the group of index finger and middle finger.

In a second aspect, there is provided a method for extracting finger vein and finger texture images from a finger of a person at the same time, the method including capturing at least one image of at least one finger in a contactless manner, extracting unique finger vein features and finger texture features from the at least one captured image, and normalizing the at least one captured image and integrating the extracted finger vein features and finger texture features.

In a third aspect, there is provided a method for identifying a person using images of a finger, the method including capturing an image of a finger of a person and extracting finger vein and finger texture information from the captured image at the same time, computing a finger texture matching score from the finger texture information, and a finger vein matching score from the finger vein information, and combining the finger vein and finger texture matching scores to generate a combined matching score to determine whether the person is a spoof suspect.

The method may further comprise rejecting the person if the finger vein matching score is low as a possible spoof suspect with spoof fingers.

The method may include an initial step of generating matching scores from templates stored in a registration database.

The finger vein information may be extracted from the captured image using a plurality of multi-orientation Gaussian filters and morphological operators.

The finger vein information may be extracted using a plurality of even-Gabor multi-orientation filters and morphological operators.

The combined matching score may be computed using a nonlinear fusion of individual matching scores from the finger vein and finger texture images.

The combined matching score may be computed using a holistic fusion of individual matching scores from the finger vein and finger texture images.

In a fourth aspect, there is provided an apparatus for extracting finger vein and finger texture images from a finger of a person at the same time, the apparatus including an image capture device to capture at least one image of at least one finger in a contactless manner, an feature extraction module to extract unique finger vein features and finger texture features from the at least one captured image, and a processing module to normalize the at least one captured image and integrate the extracted finger vein features and finger texture features.

The present invention provides a device and a method for automated personal identification that uses acquired finger vein and finger surface images at the same time. The present invention also provides a method of finger vein identification for more reliable personal identification. The present invention integrates unique finger vein features with those from low resolution finger texture images acquired at the same time.

The present invention provides a device and a method for biometrics-based personal authentication by automatically acquiring the finger vein and finger texture images from a specially designed hardware, extracting the unique features from these images, normalizing (including rotational alignment, segmentation, enhancement) the images, integrating the unique new finger vein and unique finger texture features so as to achieve the performance that is not possible by either finger vein or finger texture images individually.

There are four main advantages of the present invention. Firstly, a new standalone system is provided that uses acquired finger vein and finger texture images at the same time. Unlike other multibiometrics systems (e.g., face and fingerprint, voice and face, etc.), a user does not have to undergo the inconvenience of passing through multiple sensors and these two images are acquired at the same time. This, system achieves accuracy that is difficult to achieve with any of the systems that uses finger vein imaging. The finger vein identification approach of the present invention uses peg-free and more user friendly unconstrained imaging. Therefore, the present invention has automated steps for the acquired finger vein image normalization, rotational alignment, and segmentation to effectively minimize resulting intra-class variations in the finger images. Thirdly, the present invention offers a new approach for personal identification using distantly acquired finger texture images from the webcam imaging. The unconstrained imaging with low resolution webcam presents severe rotational and translational variations. Therefore robust image normalization and also accommodating rotational and translational variations in the matching strategy of the present invention is provided. Finally, the present invention is also a new approach for combining matching scores from finger vein and finger texture characteristics. The novel fusion approach achieves significantly improved performance which is not possible using several well known previous approaches as demonstrated from the rigorous experimental evaluation presented.

DETAILED DESCRIPTION OF THE DRAWINGS

Figure 1:
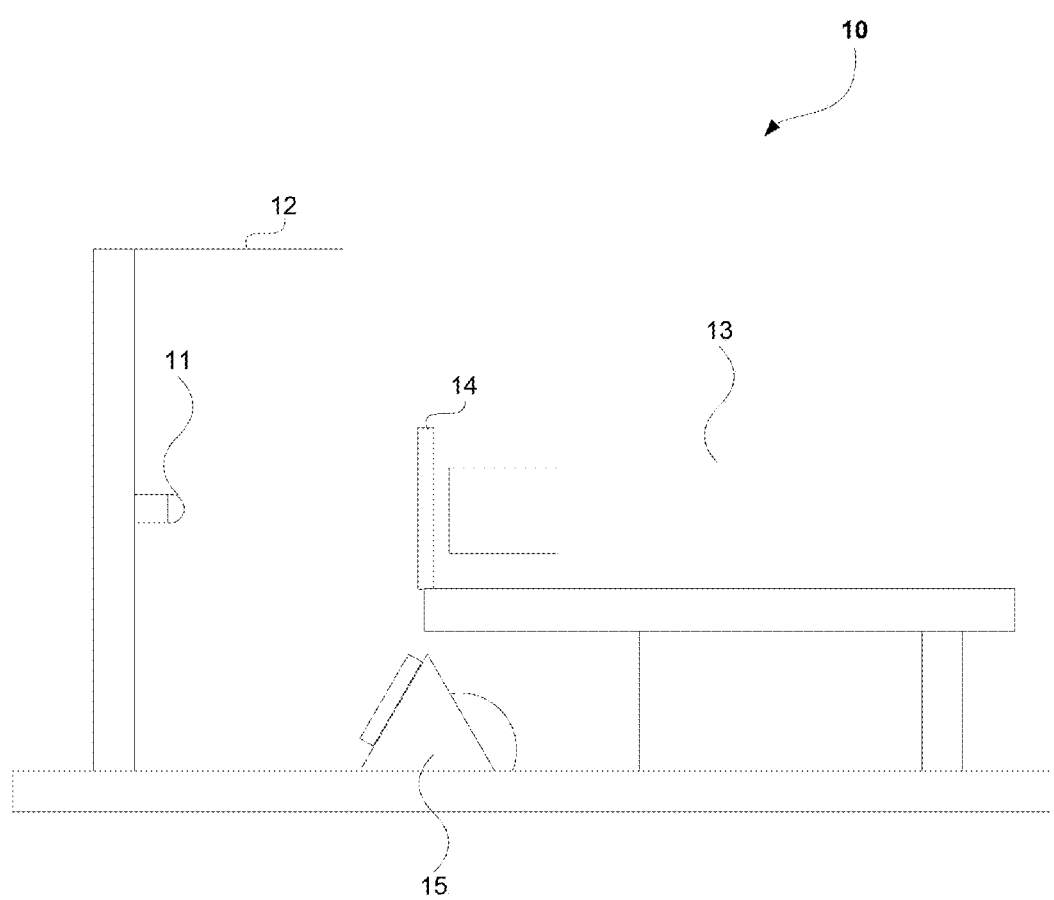
FIG. 1 is a schematic diagram of an imaging device to acquire finger vein and finger texture images at the same time, in accordance with an embodiment of the present invention.
Figure 2:
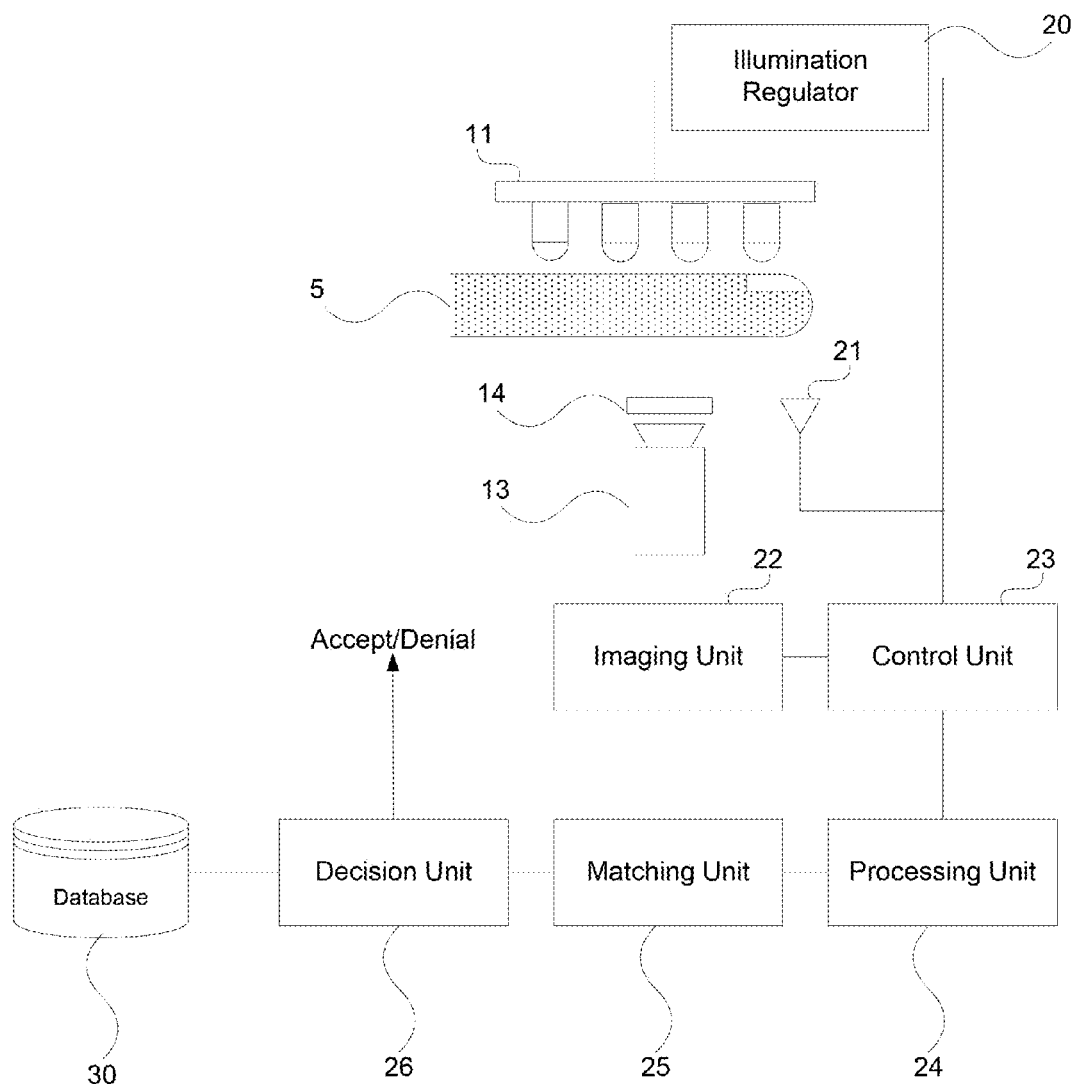
FIG. 2 is a schematic diagram of another embodiment of the imaging device with various supporting components, in accordance with an embodiment of the present invention.
Figure 3:
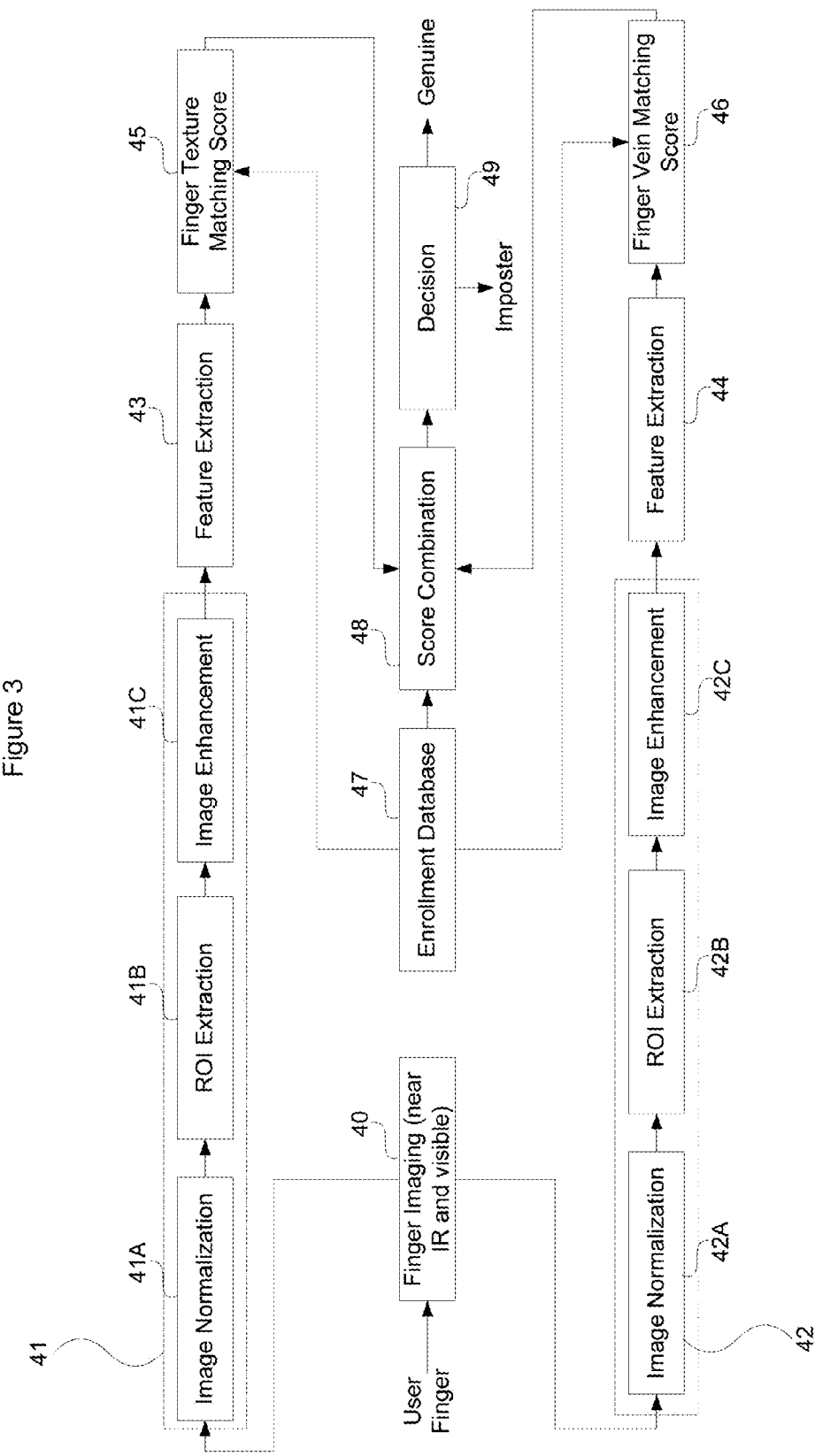
FIG. 3 is a process flow diagram that illustrates the process of identifying a person in accordance with an embodiment of the present invention.

Referring to FIGS. 1 to 3, an image acquisition device 10 is provided that acquires finger vein and finger surface images under two different illuminations at the same time. The acquired finger vein and finger texture images are subjected to pre-processing steps which automatically extract region of interest images while minimizing the translational and rotational variations. The imaging hardware automatically detects the presence of fingers, automatically switch illuminations and acquire images for processing to make a reliable decision.

Turning to FIG. 1, the image acquisition device 10 has NIR LEDs 11 to illuminate the finger with light. Above the NIR LEDs 11 is a cover 12. Opposite the NIR LEDs 11 is an NIR filter 14 and NIR camera 13 behind the NIR filter 14. Below the NIR filter 14 is a webcam 15. The NIR LEDs 11 are positioned 52 mm above the bottom. The NIR filter 14 is positioned 55 mm from the NIR LEDs 11. The NIR filter 14 and NIR camera 13 are positioned 25 mm above the bottom. The webcam 15 is positioned below the NIR filter 14 on the bottom. A user presents the dorsal surface of their finger, anywhere on a large rectangular region marked above the NIR LEDs 11. The device 10 allows capture of the fingerprint surface and fingerprint sub-surface images at the same time without the inconvenience of requiring a user to present their fingers to two different sensors at different times. The device 10 also enables contactless acquisition of finger images which is commercially important to ensure hygiene while technically important to acquire true surface details without deformations of the finger features.

Turning to FIG. 2, there is an illumination regulator 20 to regulate the illumination of the NIR LEDs 11. A finger is placed beneath the NIR LEDs 11. The amount of transmitted illumination received by the image sensor 13 is analysed in 22 and feedback to 20 to determine level of illumination required to acquire finger sub-surface details with high contrast. The control unit 23 is also responsible for synchronising and switching of NIR LEDs 11 so as to acquire the fingerprint surface and sub-surface images from the two respective image sensors. The processing unit 24 implements the key pre-processing steps (illustrated in FIG. 3 and described in the following paragraph). The feature extraction steps of the system from the normalized images are implemented in 25. The decision unit 26 is responsible for generating adaptive match decisions while comparing the corresponding templates stored in the database 30.

Turning to FIG. 3, the general process of identifying a person using the finger vein and finger texture images is illustrated. Images of the finger 5 of the person are acquired 40 by the NIR camera 13 and webcam 15. The finger texture images are essentially fingerprint images with varying resolution resulting from the contactless imaging. Images of the finger texture are processed in during image pre-processing 41, and images of the finger vein are also processed in during image pre-processing 42. During both image pre-processing 41, 42 there is image normalization 41A, 42A, ROI extraction 41B, 42B and image enhancement 41C, 42C. For finger texture images after image pre-processing 41, feature extraction 43 is performed and a finger texture matching score 45 is generated. The finger texture matching score 45 is entered into the enrollment database 47. For finger vein images after image pre-processing 42, feature extraction 44 is performed and a finger vein matching score 46 is generated. The finger vein matching score 46 is also entered into the enrollment database 47. The two matching scores 45, 46 are combined 48 and a decision 49 is made to determine whether the person is genuine or an imposter.

A feature extraction module extracts unique finger vein features and finger texture features from the captured images and performs the steps of feature extraction 43, 44. A processing module normalizes the captured images and integrates the extracted finger vein features and finger texture features. The processing module performs the steps of normalization 41A, 42A and combining 48 the matching scores.

Finger Vein Image Normalization

The finger images acquired by the image acquisition device are noisy and have significant rotational and translational variations resulting from unconstrained (peg-free) imaging. Therefore, the acquired images require extensive image normalization which includes: (i) segmentation of region of interest (ROI), (ii) translation and orientation alignment, followed by (iii) image enhancement to extract stable/reliable vascular patterns.

Figure 4:
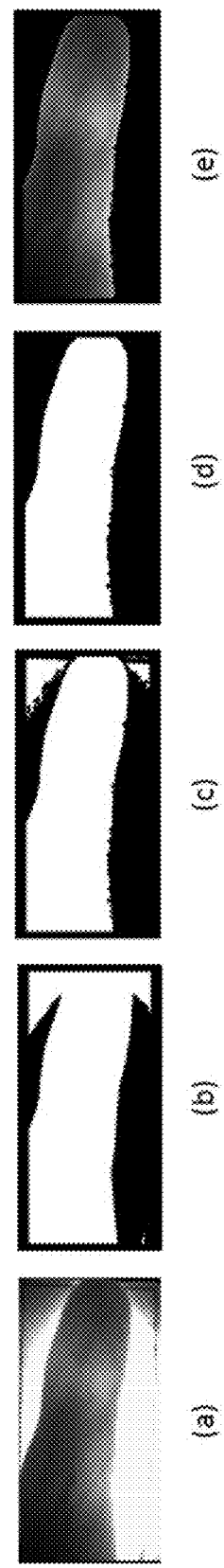
FIG. 4(a) is an extracted region of interest showing an acquired vein image sample.
FIG. 4(b) is an extracted region of interest showing a binarized image.
FIG. 4(c) is an extracted region of interest showing an edge map subtracted from FIG. 4(b)
FIG. 4(d) is an extracted region of interest showing an ROI mask from the image in FIG. 4(c), and ROI finger vein image.
Figure 5:
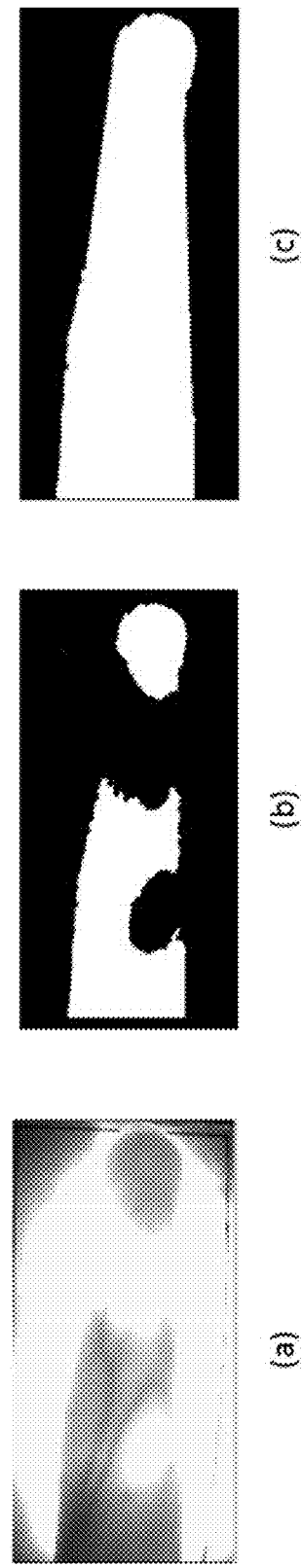
FIG. 5(a) is an acquired finger vein image.
FIG. 5(b) is an initial mask generated from FIG. 5(a)
FIG. 5(c) is the mask of FIG. 5(b) after automated correction.
Figure 6:
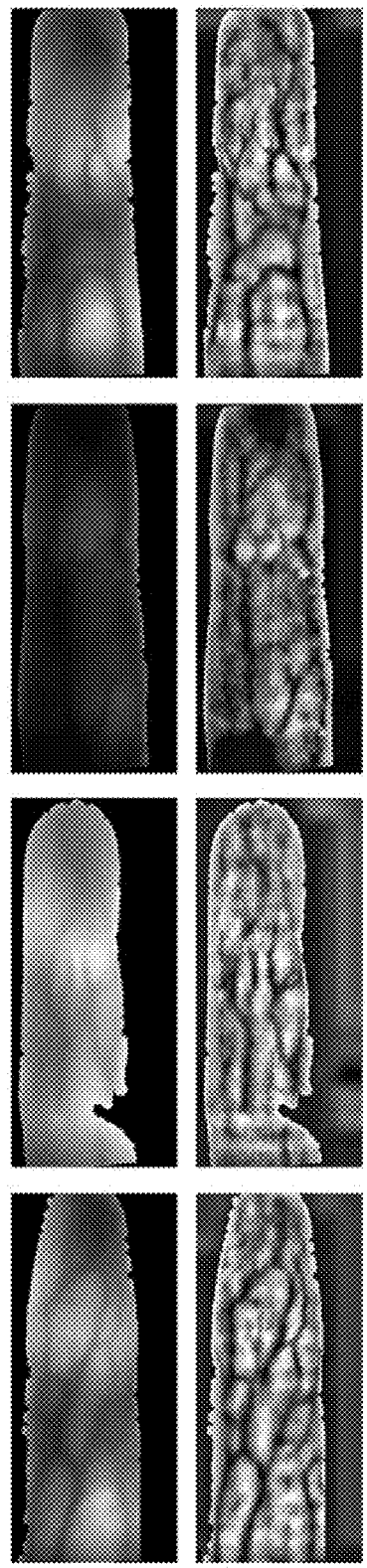
FIG. 6 is a series of finger vein images after automated localization in the upper row, and the corresponding images after enhancement in the lower row.

Referring to FIG. 4 an implementation of efficient image normalization is depicted. Image normalization generates a region of interest from each of the acquired finger vein images. However, the quality of acquired images can highly degrade in many cases. Referring to FIG. 5, the images illustrate how image processing can address this issue and efficiently generate the region of interest masks. The clarity of finger vein images varies widely and therefore a nonlinear image enhancement method is used whose results are shown in FIG. 6 to illustrate the effectiveness of the used scheme.

Finger Vein Image Feature Extraction

The normalized and enhanced finger vein images from the imaging setup depict vascular network with varying thickness, clarity and ambiguity on the topological imperfections/connections. Finger vein feature extraction is largely formulated on using real part of multi-orientation Gabor filters. The integration of the post-processing operations further enhances the stability and reliability of vein structures.

The real part of 2D Gabor filters used for the feature extraction in spatial domain has the following analytical form:

$$h(p)_\theta = \frac{1}{2\pi|c|^{1/2}} \cos\omega_m^T (p_n - p_0) \exp\left[-\frac{1}{2}(p_n - p_0)^T C^{-1} (p_n - p_0)\right]^T \quad \text{Equation [1]}$$

where $p, p_0, \omega_m \in R^2$, C is a 2×2 positive definite covariance matrix and $|C|=\det C$. The horizontal and vertical spatial coordinates are represented by vector $p=[x, y]^T$ while vector $p_0=[x_0, y_0]^T$ stands for the translation of origin. The spatial modulation frequency $\omega_m$ is however is only in one direction since only the Gabor filters are used to detect width and length. The coordinate transformation $p_n=\Sigma_n p_n$ and $p_{\alpha=0}=\Sigma_n p_0$ is used to obtain self similar even Gabor filters for different orientations using:

$$\sum_n = \begin{bmatrix} \cos\theta_n & -\sin\theta_n \\ \sin\theta_n & \cos\theta_n \end{bmatrix} \quad \text{Equation [2]}$$

Figure 7:
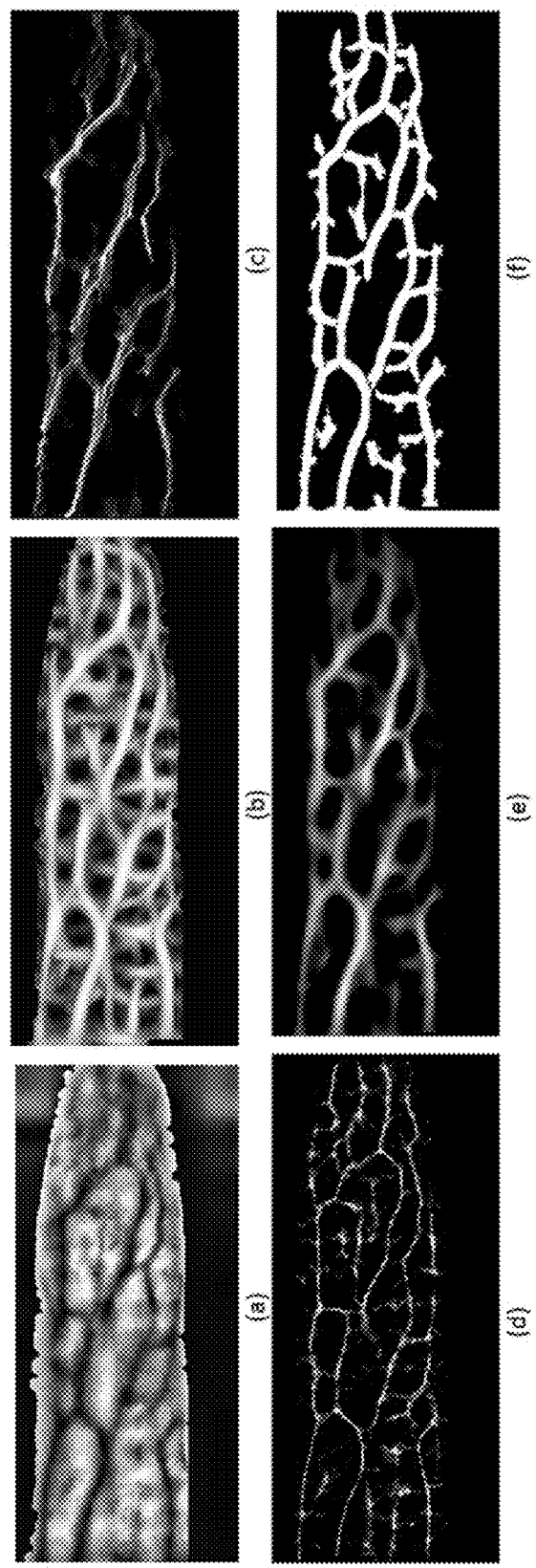
FIG. 7(a) is a sample result from feature extraction methods showing an enhanced finger vein image.
FIG. 7(b) is a sample result from feature extraction methods showing output from a matched filter.
FIG. 7(c) is a sample result from feature extraction methods showing output from repeated line tracking.
FIG. 7(d) is a sample result from feature extraction methods showing output from maximum curvature.
FIG. 7(e) is a sample result from feature extraction methods showing output from Gabor filters.
FIG. 7(f) is a sample result from feature extraction methods showing output from morphological operations on FIG. 7(e)

The angle $\theta_n$ rotates the Gabor filter for the desired orientation. The power spectrum sampling of each of the finger vein images using few self similar even Gabor filters is used for the feature extraction. These filters are obtained by the rotation of even Gabor filters in different intervals, i.e. from 0, $\pi/n$, $2\pi/n$ to $(n-1)\pi/n$, while the value of n is determined from the prior knowledge of imaging sensors in the apparatus. The generation of a combined feature map can be described as follows:

$$f(x,y) = \max_{\forall n=1,2,\ldots 12} \{h'_{\theta_n}(x,y) * v(x,y)\} \quad \text{Equation (3)}$$

where $h_{\theta_n}(x,y)$ represents zero mean $h_{\theta_n}(x,y)$, i.e., obtained by normalizing the filter coefficients, * represent convolution operation and $v(x, y)$ is normalized and enhanced finger vein image. The FIG. 7(e) shows the combined output from the set of even Gabor filters and it can be observed from this sample image that the extracted vein structure fits quite well in the original image vascular topologies and the accompanying noise is suppressed very well. The venous patterns in the combined output image $f(x, y)$ are subjected to morphological operations to further enhance the clarity of vein patterns. The morphological operations typically compare a vein image with another known object; i.e., structuring element. The shape and size of this structuring element is chosen to effectively eliminate noise in the combined filtered images. The phase information is encoded from the resulting feature map which is stored as the feature vector or feature template for matching.

Generating Finger Vein Matching Scores

The matching scores between two finger vein feature vectors R(x, y) should be robust to accommodate the translational and rotational variations in the normalized vein images. These variations, i.e., translational and rotational, are often caused by inaccurate (non-ideal) presentation of fingers in the imaging setup or due to the inaccurate localization and normalization. Therefore, the matching score scheme that is used computes the best matching scores between two images while accounting for such possible spatial shifts and rotation. The matching scores between two binarized feature map R and T are generated as follows:

$$S_v(R, T) = \min_{\forall i \in [0, 2w], \forall j \in [0, 2h]} \left( \frac{\sum_{x=1}^{m} \sum_{y=1}^{n} \odot(\hat{R}(x+i, y+j), T(x, y))}{\sum_{x=1}^{m} \sum_{y=1}^{n} (\hat{R}(x+1, y+j) \oplus -1)} \right),$$

Equation [4]

where m and n represent the width and height of the feature map respectively. The registered feature image is represented as R with width and height expanded to 2w+m and 2h+n, and $\oplus$ is the Exclusive OR operator that generates unity while two operands are different and zeros otherwise, while $$w = \text{floor}\left(\frac{m}{t_w}\right), h = \text{floor}\left(\frac{n}{t_h}\right),$$

Equation [5]

$$\hat{R}(x, y) = \begin{cases} R(x-w, y-h) & x \in [h+1, h+n] \\ -1 & \text{otherwise,} \end{cases}$$

Equation [6]

$$\odot(J, K) = \begin{cases} 0 & \text{if } J - K \neq 255 \text{ or } J = -1 \\ 1 & J - K = 255, \end{cases}$$

Equation [7]

where $t_w$ and $t_h$ are the constants introduced to control the translation distance over horizontal and vertical direction. The background of the feature map is relatively larger and this part (the background that is not occupied by the finger) will contribute a lot of errors during the matching stage. Therefore, it is judicious to introduce a mask that indicates the effective finger area during matching so that the non-informative mismatches can be eliminated. The generation of a mask is quite straightforward as the background values were automatically filled during the normalization stage. In other words, whenever the pixel intensity values are not equal to the filled background value, that position is regarded as finger area. Therefore, the generation of mask can be mathematically illustrated as follows:

$$M = \{(x,y) | \forall (x,y) \in I, I(x,y) \neq I_{bg}\}$$

Equation (8)

where $I$ represents for a given normalized finger vein image. The generation of matching scores using the corresponding masks can be described as follows:

$$S_v(R, T, M_R, M_T) = \min_{\forall i \in [0, 2w], \forall j \in [0, 2h]}$$

Equation [9]

$$\left( \frac{\sum_{x=1}^{m} \sum_{y=1}^{n} \odot(\hat{R}(x+i, y+j), T(x, y), M_R(x+i, y+j), M_T(x, y))}{\sum_{x=1}^{m} \sum_{y=1}^{n} M_R(x, y) \cap M_T(x, y)} \right)$$

where $M_R$ and $M_T$ represents the corresponding masks for the registered image R and test image and T respectively, and the operator $\odot$ is defined as following:

$$\odot(J, K, M, N) =$$

Equation [10]

$$\begin{cases} 0 & \text{if } M = N \text{ and } J - K \neq 255 \text{ or } J = -1 \\ 1 & J - K = 255 \end{cases}$$

Finger Texture Image Normalization and Enhancement

Figure 8:
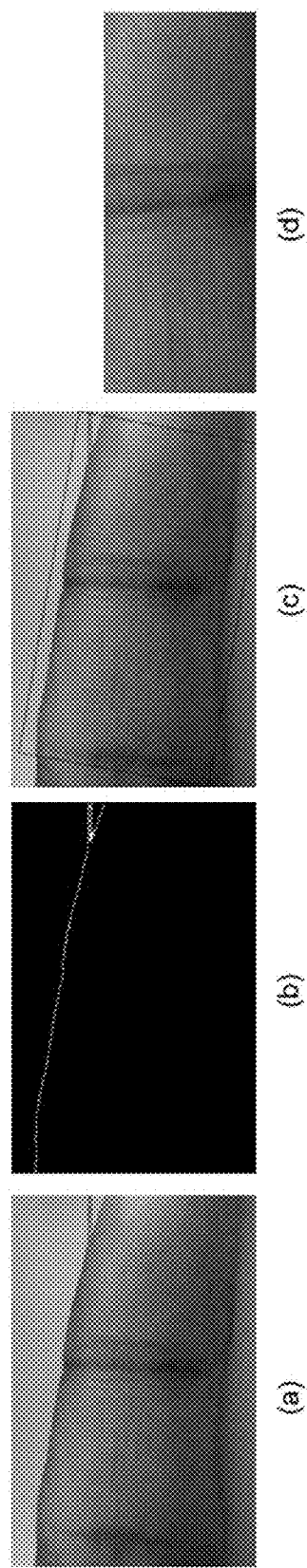
FIG. 8(a) shows an original image prior to automated localization of finger texture regions
FIG. 8(b) is a refined edge map.
FIG. 8(c) is a localized rectangular region of interest.
FIG. 8(d) is a segmented region.

The unconstrained finger texture imaging used does not require any special illumination. Therefore there are some uneven illumination and shadows in the acquired images which results in the sharper contrast of upper finger boundaries than lower finger boundaries. Hence the upper finger boundary is used for the finger texture localization and segmentation. As shown in FIG. 8, the edge map is used to localize the finger boundaries. This edge map also illustrates isolated noise and edges, especially near the lower finger boundaries, which are firstly eliminated. The slope of the resulting upper finger boundary is then estimated. This slope is used to automatically localize a fixed rectangular area which begins at a distance of fixed number of pixels from the upper finger boundary and is aligned along its estimated slope.

The finger texture image is subjected to noise filtering to eliminate the impulsive noise often present in the webcam acquired image. The resulting images have low contrast and uneven illumination. Therefore the background illumination image is obtained from the average of pixels in a sub-block region. The background illumination is subtracted from the noise filtered finger texture image and then subjected to histogram equalization. The image enhancement steps incorporated so far improves the amount of contrast and the effect of uneven illumination. However, they are not adequate to extract finger texture details. Therefore the resulting image is subjected to further processing. It can be observed from the sample results in FIG. 9(b) that the processing steps have been fairly successful in further improving the image contrast and texture details.

Finger Texture Feature Extraction

The low-resolution finger texture images typically illustrate line-like structures and curves which suggests that the feature extraction approaches that can efficiently extract such localized information is likely to work well. The localized Radon transform (LRT) and Gabor filter based extraction of such localized texture orientation details have shown to offer promising results for the identification of finger knuckles. Therefore LRT based approaches are used to develop a robust matching strategy for that can account for high translation and rotational variations. Curved lines can be estimated by small piecewise line segments and it integrates the intensity value in a local region in all defined orientations. An image representation of extracted features is shown in FIG. 10(b). It can be seen from this image that the line-like features in the left part of the image is well presented, however, for the region that have highly curved lines like shown in the right part of the image, the feature is not so representative.

Generating Finger Vein Matching Scores

The normalized and enhanced finger texture images illustrate significant rotational and translational variations. The matching scores among the localized sub finger texture regions (in two images) are more robust to rotations and local/partial distortions. Such localized matching scores should be more effectively accounted while matching low resolution finger texture images. Therefore a block-wise matching scheme is used and is described.

Let G and P represent the gallery and probe finger texture templates respectively, $b_w$ and $b_h$ represent for the block width and height respectively, and $s_x$ and $s_y$ stand for the amount of translation in horizontal and vertical directions. The generation of combined matching scores using the block-wise matching strategy can be summarized as follows:

---

Function BlockwiseMatch(G, P, $b_w$, $b_h$, $s_x$, $s_y$)

B = ConstructBlocks(P, $b_w$, $b_h$)
  for each block b in B do
    for each $t_x \in [-s_x, s_x]$, $t_y \in [-s_y, s_y]$ $t_x \in [-s_x, s_x]$ do
      Align the upper-left corner of b to ($b_x + t_x$, $b_y + t_y$) in G.
      Calculate and store the mismatch into set M.
    end
    $ms_b$ = min (M)
  end
  Matching scores = $\Sigma_{\forall b \in B}\, ms_b$

---

Generating Matching Scores

The observations from the finger texture and finger vein images acquired at the same time are effectively integrated to achieve a performance that is not possible by existing systems. The vein and finger texture matching scores are combined using following nonlinear method:

$$S_c = (\epsilon + s_v)^{w} * (\epsilon + s_t)^{2-w} \quad \text{Equation (11)}$$

$S_c$ represents the combined matching score from the matching score $s_v$ and $s_t$ generated respectively from finger vein and finger texture images. The constants $\epsilon$ and w are determined empirically. This method of nonlinear combination achieves the best performance as shown from rigorous experimental results. Another embodiment can also use the holistic criteria to combine the two match scores and generate the combined scores as follows:

$$S_c = \{(s_v * w) + (s_t * (1-w))\} + \frac{\{(s_v * w) + (s_t * (1-w))\}}{(2 - s_v)} \quad \text{Equation [12]}$$

The parameter w can be any number and is also an empirically estimated. The art of combining the two match scores is to truly account for the reality of source modality and is another new feature of this system.

Results

In order to ascertain the performance improvement and utility of the system, rigorous experiments are performed on the database. The finger image database used was composed with 255,192 images from 156 volunteers, and the images were acquired over a period of eleven months using the imaging device as described. The finger images were also acquired in second sessions with a minimum one month, maximum over six months and on average 66.8 days interval. A total of 105 subjects turned up for the imaging during the second (time) session. In each session, all the subjects provided 6 image samples from index finger middle finger respectively, and each sample consisting of one finger vein image and one finger texture image from left hand. Therefore, each subject provided 24 images in one session.

TABLE 1

Performance from finger vein matching with various approaches with mask

| Approach | Index Finger | Middle Finger | Index and Middle Finger |
|---|---|---|---|
| Even Gabor with Morphological | 3.33% | 6.99% | 4.91% |
| Repeated line tracking | 15.60% | 18.18% | 16.43% |
| Maximum curvature | 10.96% | 11.08% | 10.99% |
| Matched filter | 4.84% | 7.81% | 5.31% |
| Even Gabor | 3.82% | 7.08% | 4.61% |

TABLE 2

Performance from finger texture matching with various approaches

| Approach | Index Finger | Middle Finger | Index and Middle Finger |
|---|---|---|---|
| LRT (global) | 6.58% | 8.58% | 7.79% |
| LRT (local) | 5.50% | 7.91% | 6.86% |
| LRT (global with rotation) | 3.95% | 6.92% | 5.75% |
| LRT (local with rotation) | 4.49% | 7.08% | 5.73% |
| CompCode | 13.92% | 15.73% | 14.76% |

TABLE 3

Combined performance (EER) from experiments

| Approach | Index Finger | Middle Finger | Index and Middle Finger |
|---|---|---|---|
| Average | 2.18% | 5.50% | 3.56% |
| Product | 1.84% | 3.83% | 2.80% |
| Weighted Sum | 1.80% | 3.80% | 2.65% |
| Dempster-Shafe | 1.55% | 3.98% | 3.23% |
| Heuristics | 1.42% | 4.02% | 2.72% |
| Nonlinear | 1.35% | 3.85% | 2.45% |
| Likelihood ratio | 3.33% | 7.94% | 4.84% |

TABLE 4

Average rank one recognition accuracy from the experiments

| | Finger Vein | | Finger Texture | | Combined | |
|---|---|---|---|---|---|---|
| Dataset | Index Finger | Middle Finger | Index Finger | Middle Finger | Index Finger | Middle Finger |
| I | 93.49% | 88.25% | 93.97% | 87.94% | 98.10% | 94.60% |
| II | 90.08% | | 89.05% | | 96.03% | |
| III | 88.89% | | 87.86% | | 95.40% | |

Experimental Results from Individual Approaches

The key objective of the experiments was to ascertain the robustness of various algorithms when the finger image data from, two sessions is used. The time span between data/imaging sessions is likely to introduce variations in the images, mainly from temporal changes (if any, in vein and/or texture patterns) and/or pose variations resulting from loosely constrained finger imaging. Firstly, six finger images and six finger texture images acquired during the first imaging session were used to build up the training set while the corresponding twelve images acquired during the second session are uses as testing/validating data to ascertain the performance. Therefore, the number of genuine score is 630 (105×

6) and the number of imposter score is 65,520 (105×104×6) for each of the finger vein and finger texture matching. Secondly, the different fingers from the same subjects were treated as belonging to different class (i.e. 210 classes), and the performance was also ascertained using the same protocol as mentioned before which resulted in 1,260 (210×6) genuine and 263,340 (210×209×6) imposter scores for each of the verification cases. The experimental results using equal error rate (EER) is summarized in table 1 and table 2 respectively for vein and texture image matching. The receiver operating characteristics (ROC) for the corresponding performances is illustrated in FIG. 9-10.

Figure 9:
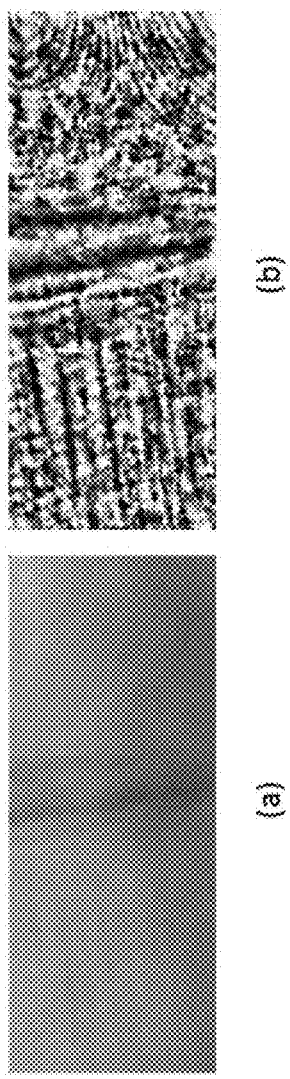
FIG. 9(a) is a normalized finger texture region image.
FIG. 9(b) is an enhanced image of FIG. 9(a)
Figure 10:
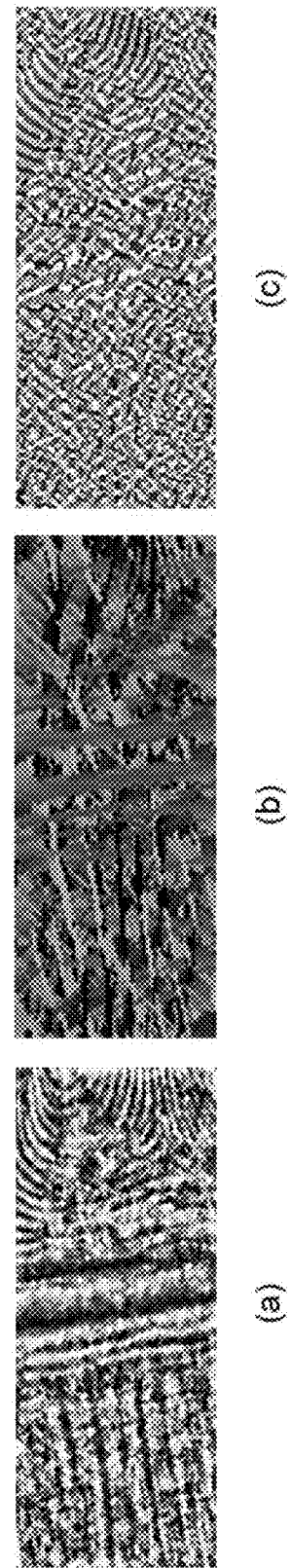
FIG. 10(a) is an enhanced finger texture image.
FIG. 10(b) is a corresponding feature map using localized Radon transform (LRT)
FIG. 10(c) is a corresponding feature map using Gabor filters.

The experimental results from table 1 and FIG. 9 confirm that the scheme using even Gabor filters with the morphological processing achieves the best performance among all the prior state of the art (as demonstrated from experiments). The repeated line tracking [5] and the maximum curvature approach [6] does not perform well. The repeated line tracking has been shown to offer promising results [9] even on noisy vein images but has been argued [10] for its limited ability to extract thin vein structure from vein images. The poor performance (table 1 and FIG. 9) of line tracking and maximum curvature, on the finger vein database acquired in more realistic condition, can also be attributed to the fact that extracted vein feature representation is also/mainly contributed from the doubtful/confusion regions. In other words, the matching from such regions is unlikely to generate erroneous matches during imposter matching.

Figure 11:
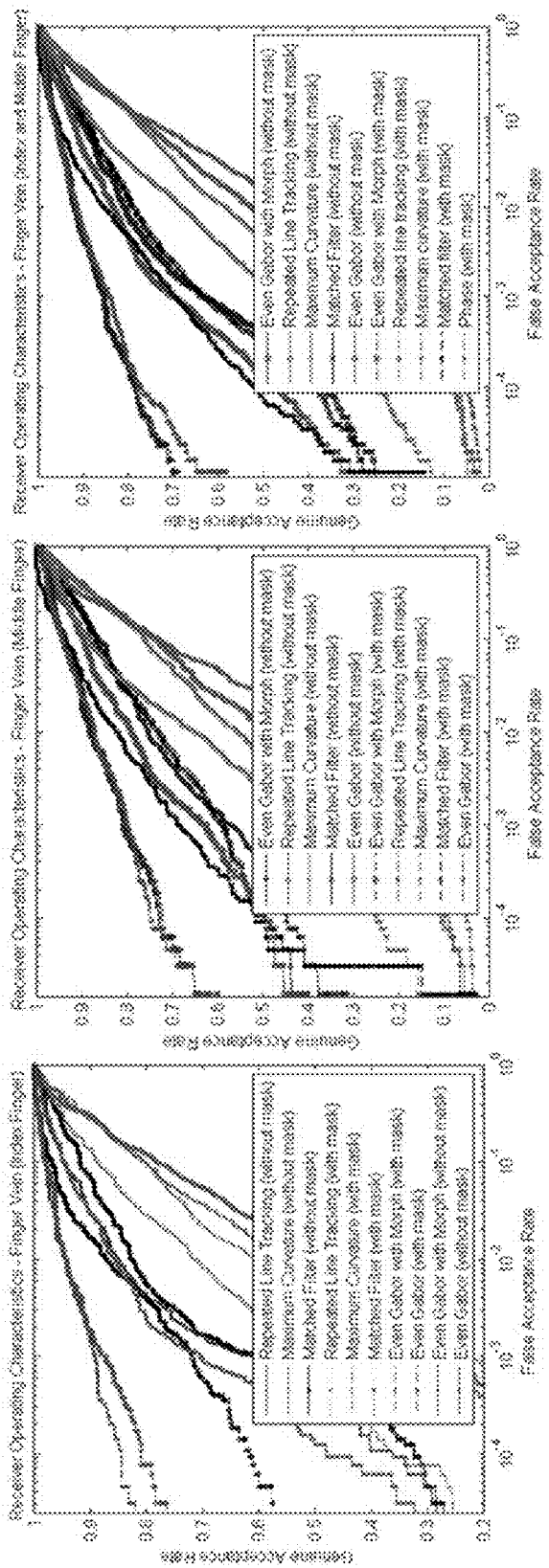
FIG. 11 is a series of charts illustrating Receiver Operating Characteristics from finger vein images authentication experiments.

The performance from the middle finger vein and finger texture image matching is worse than those from the index finger images. This can be possibly attributed to the relatively higher inconvenience with the placement of straight fingers in unconstrained imaging for the middle fingers than for the index fingers (which often/could result in higher pose and scale changes). FIG. 11 illustrates typical pose variations in middle finger texture images to which are effectively addressed in the image normalization and matching schemes. The experimental results in table 2 and FIG. 10 demonstrates that the LRT based matching performs significantly better than compcode (in the literature) which suggests its advantage in encoding line-like local features. The local matching searches the lowest errors between the corresponding blocks by using translations in the local area, this may involve high probability of getting lower error while matching to both genuine and imposter subjects as compared to the global one, due to its relatively small block size (as compared to the whole image). In summary, the localized matching scheme used in the system is highly successful in the performance improvement over the conventional globalized approach. Such scheme can be preferred in another embodiment where the additional rotated samples in registration database cannot be used due to the storage and computational constraints.

Performance from Finger Vein and Finger Texture Combination

Figure 12:
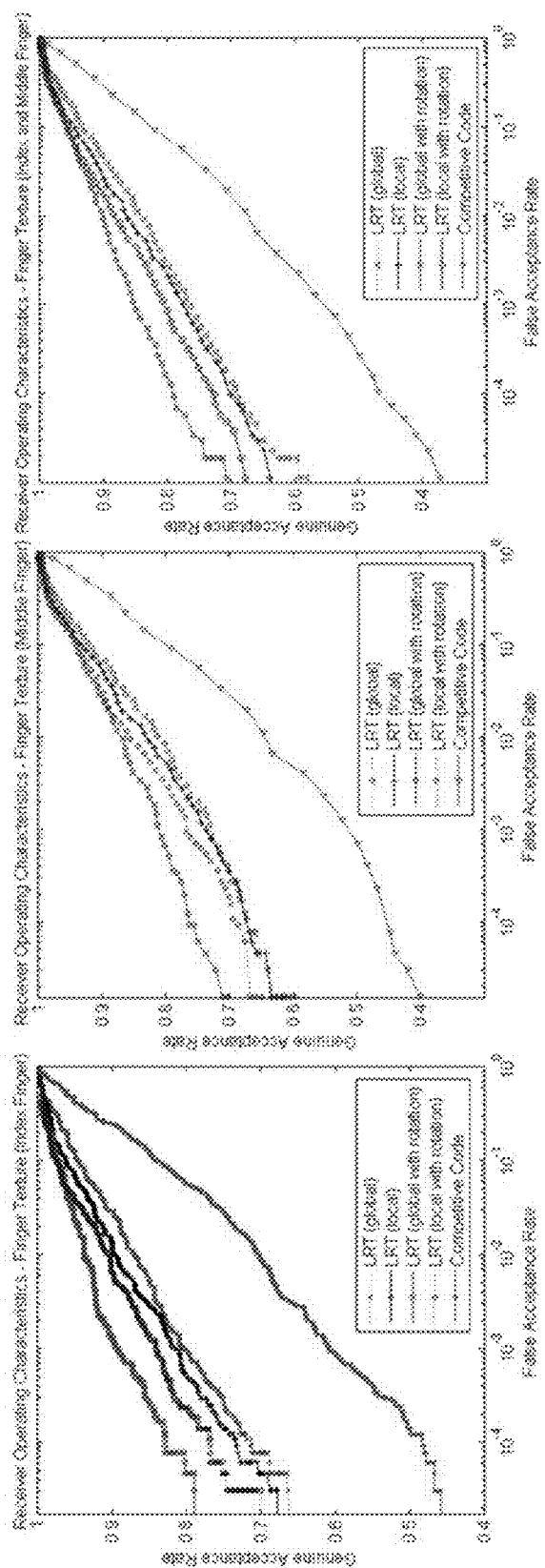
FIG. 12 is a series of charts illustrating Receiver Operating Characteristics from finger texture images authentication experiments.

The experimental results from the system are now presented to illustrate the performance improvement that has been achieved from the finger vein and finger texture images acquired at the same time. The experimental results using equal error rate (EER), are summarized in table 3. The receiver operating characteristics from the various score combination schemes is illustrated in FIG. 12. The weights for the weighted sum combination were empirically computed only from the training data. The experimental results consistently suggest that the combination of finger vein and finger texture images acquired at the same time to achieve significant performance from the system. The comparative evaluation of the achieved performance from the individual finger image matching with those from the combined case i.e., considering index and middle finger as separate classes, suggest the high uniqueness of finger vein and finger texture even between the two fingers of the same individuals. Another observation that can be noticed from the results in this section (table 3, FIG. 12) is that the nonlinear combination (almost) consistently achieves better performance as compared to the other score level combination approaches considered in this work.

Performance from Recognition Experiments

In this section, the experimental results for the recognition performance using the system are summarized. The experiments in this section are organized from the four categories of dataset combinations to ascertain the recognition performance from individual fingers and in their combination. Firstly the dataset combination is used when the finger images from the 105 subjects in two different sessions are used for the identification. The cumulative match characteristics (CMC) from this set of experiments are shown in FIG. 13(a) while the first row of table 4 illustrates the rank one recognition accuracy (using nonlinear combination as it achieves best results).

Figure 13:
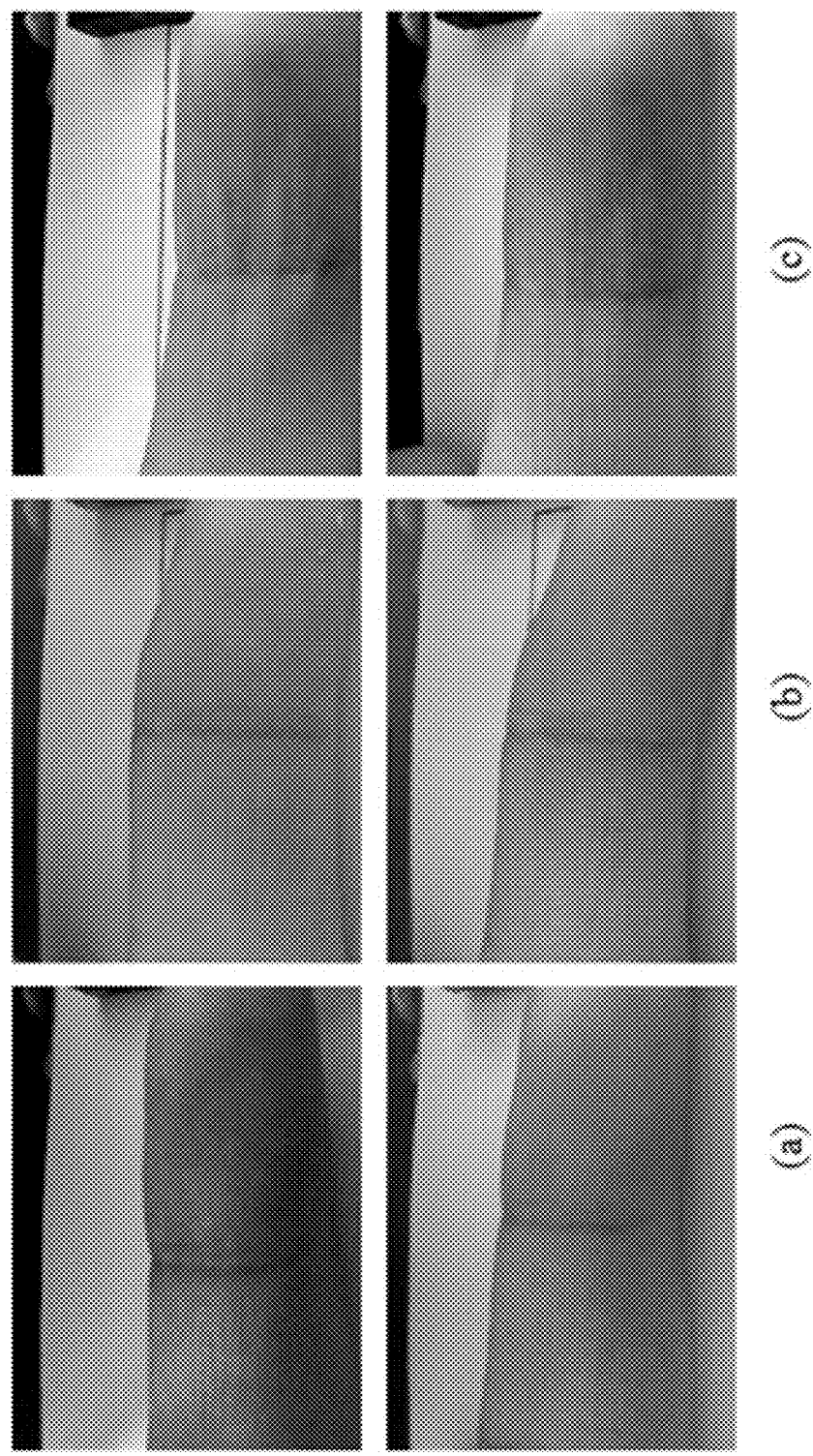
FIG. 13(a) shows a middle finger bent forward.
FIG. 13(b) shows a middle finger bent backward and tilted.
FIG. 13(c) shows a middle finger bent forward and some scale changes.
Figure 14:
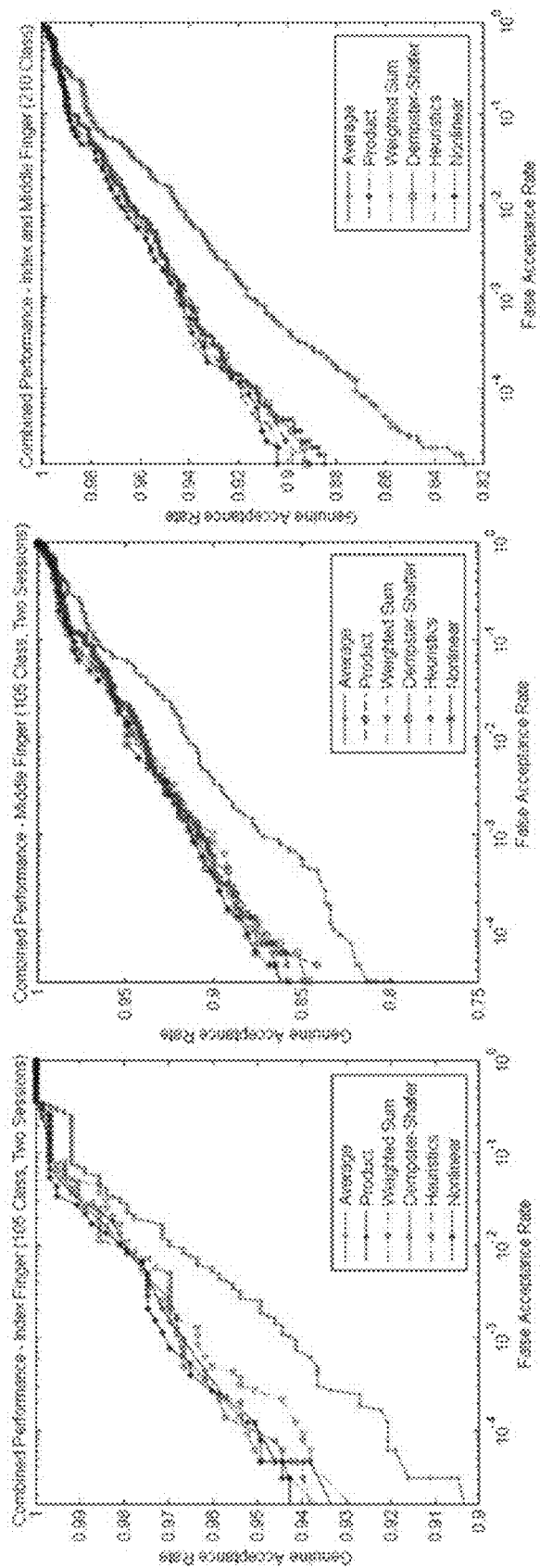
FIG. 14 is a series of charts showing Receiver operating characteristics from the combination of finger texture and finger vein matching scores from the index finger, middle finger and index and middle finger images (210) class.
Figure 15:
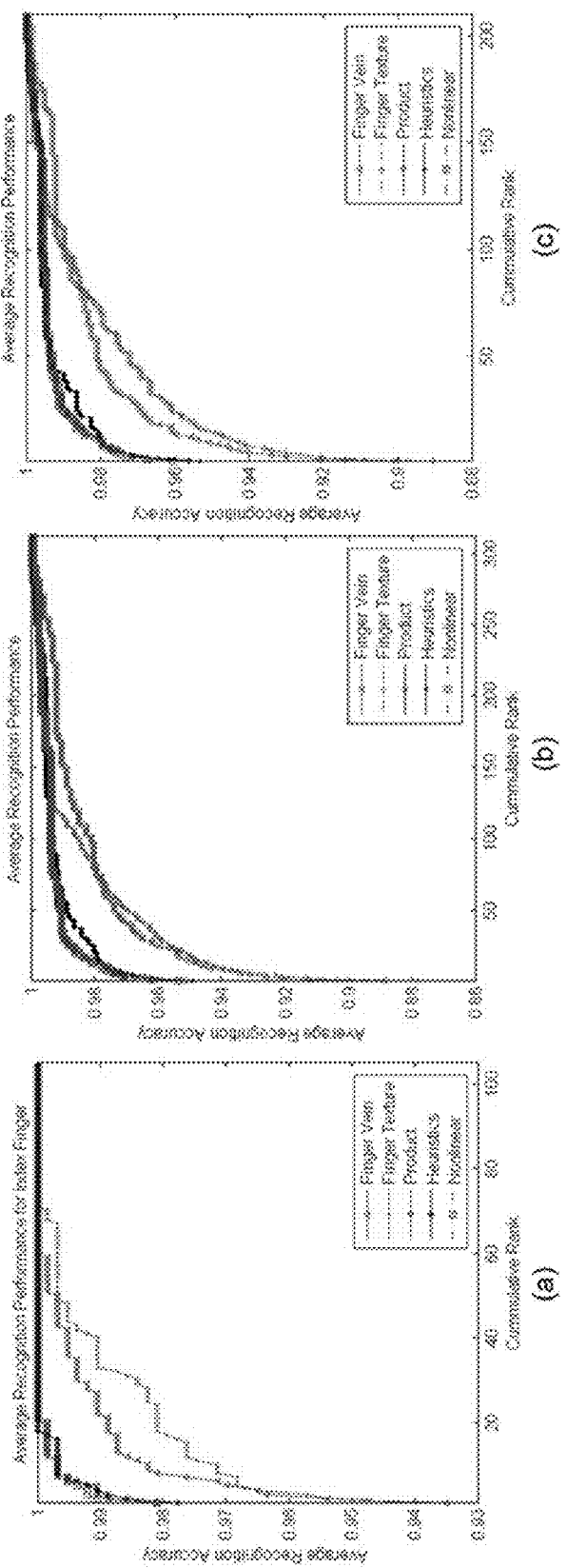
FIG. 15 is a series of charts showing cumulative match characteristics from dataset I, dataset II, and dataset III.

In the second category, the dataset from the index and middle finger as belonging to separate class, i.e. 210 classes is used, and report the recognition performance from the 210 query/test cases in table 4 (second row) while the corresponding CMC is illustrated in FIG. 13(b). Another extension of this is the third category in which the same dataset in third category set, i.e. 210 classes, was used for the registration while the recognition performance from the 312 class, i.e. 210 registered and 102 (51*2) unregistered classes, is reported in table 4 (third row) while the corresponding CMC is illustrated in FIG. 13(c). The best rank one recognition performance was achieved from the nonlinear combination of finger vein and finger texture matching scores in all the three dataset combinations. The experimental results presented in this section on the finger recognition also consistently suggest the significant improvement in the performance using the system.

A new device and a method of automated personal identification is provided that uses finger vein and finger surface images acquired at the same time. The system acquires the finger surface and finger subsurface features at the same time using an imaging device. Such a system offers better anti-spoofing capabilities and provides improved performance as illustrated from the performance analysis presented. The experimental results presented in previous section consistently suggest that the method of automated finger vein identification in the system achieves significantly improved performance over the earlier approaches on the finger vein images acquired in most realistic and loosely constrained conditions. The experimental results from the combination of finger texture and finger vein images achieve significant improvement in the performance, e.g. about 59%, 45%, and 50% improvements in terms of EER for the index finger, middle finger and in combination respectively in experiments. The effectiveness of this achieved performance from the loosely constrained finger texture images can be attributed to the implemented steps of image normalization, alignment, robust feature extraction and importantly the matching strategy which can further minimize the influence of resulting scale and rotational variations in the loosely constrained imaging setup. The holistic combination of matching scores has also been highly successful as it outperforms Dempster-Shafer and weighted sum results in almost all cases. The novel nonlinear score combination method of matching score combination, has shown to consistently outperform the other fusion presented in the literature, in both verification and identification scenario.

It will be appreciated by persons skilled in the art that numerous variations and/or modifications may be made to the invention as shown in the specific embodiments without departing from the scope or spirit of the invention as broadly described. The present embodiments are, therefore, to be considered in all respects illustrative and not restrictive.

What is claimed:

1. A system for extracting finger vein and finger texture images from a finger of a person at the same time, the system comprising:
- an image capture device configured to capture a plurality of images of at least one finger in a contactless manner, where the plurality of images comprise at least one finger vein image acquired utilizing a near infrared illumination and at least one finger texture image acquired utilizing a visible light illumination;
- a feature extraction module configured to:
  - extract unique finger vein features and finger texture features from the plurality of captured images, wherein the finger texture features comprise at least one fingerprint image;
  - compute a finger texture matching score from the finger texture features, and a finger vein matching score from the finger vein features; and
  - combine the finger vein and finger texture matching scores to generate a combined matching score by computing for the combined matching score $S_c$ such that:

$$S_c = (\epsilon + s_v)^w * (\epsilon + s_t)^{(2-w)}$$

where $s_v$ and $s_t$ are the finger vein and finger texture matching scores, respectively, and $\epsilon$ and $w$ are empirically determined constants; and
- a processing module configured to normalize the plurality of captured images and integrate the extracted finger vein features and finger texture features.

2. The system according to claim 1, wherein the feature extraction module is configured to extract a region of interest before extracting the unique finger vein features and finger texture features.

3. The system according to claim 1, further comprising a searching module configured to search a registration database using the extracted finger vein features to determine the identity of the person.

4. The system according to claim 1, wherein the feature extraction module is configured to generate a robust matching score using the finger texture features to search against matching scores of templates stored in the registration database.

5. The system according to claim 1, wherein normalization of the image includes rotational alignment, segmentation, or enhancement.

6. The system according to claim 1, wherein the unique finger vein features are any one from the group consisting of: index finger and middle finger.

7. A method for identifying a person using images of a finger, the method comprising:
- capturing a plurality of images of a finger of a person in a contactless manner using an image capture device, where the plurality of images comprise at least one finger vein image acquired utilizing a near infrared illumination and at least one finger texture image acquired utilizing a visible light illumination;
- extracting finger vein and finger texture features from the plurality of captured images at the same time using a feature extraction module, wherein the finger texture features comprise at least one fingerprint image;
- normalizing the plurality of captured images and integrating the extracted finger vein feature and finger texture features using a processing module;
- computing a finger texture matching score from the finger texture features, and a finger vein matching score from the finger vein features using the feature extraction module; and
- combining the finger vein and finger texture matching scores to generate a combined matching score using the feature extraction module by computing for the combined matching score $S_c$ such that:

$$S_c = (\epsilon + s_v)^w * (\epsilon + s_t)^{(2-w)}$$

where $s_v$ and $s_t$ are the finger vein and finger texture matching scores, respectively, and $\epsilon$ and $w$ are empirically determined constants, to determine whether the person is a spoof suspect.

8. The method according to claim 7, further comprising rejecting the person if the finger vein matching score is low as possible spoof suspect with spoof fingers.

9. The method according to claim 7, comprising an initial step of generating matching scores from templates stored in a registration database.

10. The method according to claim 7, wherein the finger vein features are extracted from the captured images using a plurality of multi-orientation Gaussian filters and morphological operators.

11. The method according to claim 7, wherein the finger vein features are extracted using a plurality of even-Gabo multi-orientation filters and morphological operators.

12. The method according to claim 7, wherein the combined matching score is computed using a nonlinear fusion of individual matching scores from the finger vein and finger texture images.

13. The method according to claim 7, wherein the combined matching score is computed using a holistic fusion of individual matching scores from the finger vein and finger texture images.

14. An apparatus for extracting finger vein and finger texture images from a finger of a person at the same time, the apparatus comprising:
- an image capture device configured to capture a plurality of images of at least one finger in a contactless manner, where the plurality of images comprise at least one finger vein image acquired utilizing a near infrared illumination and at least one finger texture image acquired utilizing a visible light illumination;
- a feature extraction module configured to:
  - extract unique finger vein features and finger texture features from the plurality of captured images, wherein the finger texture features comprise at least one fingerprint image;
  - compute a finger texture matching score from the finger texture features, and a finger vein matching score from the finger vein features; and
  - combine the finger vein and finger texture matching scores to generate a combined matching score by computing for the combined matching score $S_c$ such that:

$$S_c = (\epsilon + s_v)^w * (\epsilon + s_t)^{(2-w)}$$

where $s_v$ and $s_t$ are the finger vein and finger texture matching scores, respectively, and $\epsilon$ and $w$ are empirically determined constants; and
- a processing module configured to normalize the plurality of captured images and integrate the extracted finger vein features and finger text features.

* * * * *